(12) United States Patent
Isogawa et al.

(10) Patent No.: US 11,277,866 B2
(45) Date of Patent: Mar. 15, 2022

(54) COMMUNICATION DEVICE AND RANDOM ACCESS CONTROL METHOD

(71) Applicant: NTT DOCOMO, INC., Tokyo (JP)

(72) Inventors: Takayuki Isogawa, Tokyo (JP); Naoto Ookubo, Tokyo (JP); Kohei Kiyoshima, Tokyo (JP); Takahiro Takiguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 289 days.

(21) Appl. No.: 16/303,372

(22) PCT Filed: May 9, 2017

(86) PCT No.: PCT/JP2017/017522
§ 371 (c)(1),
(2) Date: Nov. 20, 2018

(87) PCT Pub. No.: WO2017/203969
PCT Pub. Date: Nov. 30, 2017

(65) Prior Publication Data
US 2020/0322992 A1 Oct. 8, 2020

(30) Foreign Application Priority Data

May 27, 2016 (JP) .............................. JP2016-106835

(51) Int. Cl.
*H04W 74/08* (2009.01)
*H04W 74/02* (2009.01)
*H04W 76/27* (2018.01)

(52) U.S. Cl.
CPC ....... *H04W 74/0833* (2013.01); *H04W 74/02* (2013.01); *H04W 74/0891* (2013.01); *H04W 76/27* (2018.02)

(58) Field of Classification Search
CPC ..... H04W 16/32; H04W 72/04; H04W 74/02; H04W 74/08; H04W 74/0833;
(Continued)

(56) References Cited

U.S. PATENT DOCUMENTS 10,813,131 B2 * 10/2020 Guo ...................... H04W 52/38
2010/0113051 A1 * 5/2010 Du ...................... H04W 74/002
455/450

(Continued)

FOREIGN PATENT DOCUMENTS

JP 2011176738 A 9/2011
WO 2014177002 A1 11/2014
WO 2015/072703 A1 5/2015

OTHER PUBLICATIONS

Extended European Search Report issued in counterpart European Patent Application No. 17802564.9, dated Oct. 2, 2019 (9 Pages).
(Continued)

*Primary Examiner* — Liton Miah
(74) *Attorney, Agent, or Firm* — Osha Bergman Watanabe & Burton LLP

(57) ABSTRACT

A communication device used as a first communication device in a wireless communication system including the first communication device, a second communication device communicating with the first communication device, and a user equipment communicating with the first communication device, includes an acquisition unit configured to acquire a parameter used for performing a random access procedure from the second communication device; and a control unit configured to transmit, in the case of receiving a random access preamble from the user equipment in a random access channel indicated by the parameter, information indicating that the random access preamble indicated (Continued)

by the parameter is received from the user equipment to the second communication device.

12 Claims, 9 Drawing Sheets

(58) Field of Classification Search
CPC . H04W 74/0891; H04W 76/27; H04W 92/12; H04W 92/20
See application file for complete search history.

(56) References Cited

U.S. PATENT DOCUMENTS

| | | | | |
|---|---|---|---|---|
| 2012/0214538 | A1* | 8/2012 | Kim | H04W 52/50 455/522 |
| 2016/0073273 | A1* | 3/2016 | Li | H04W 16/06 455/449 |
| 2016/0205705 | A1 | 7/2016 | Chen | |
| 2016/0262179 | A1 | 9/2016 | Choi et al. | |
| 2017/0273055 | A1* | 9/2017 | Xu | H04W 72/04 |
| 2017/0331577 | A1* | 11/2017 | Parkvall | H04J 11/0079 |
| 2020/0274651 | A1* | 8/2020 | Yi | H04W 12/088 |

OTHER PUBLICATIONS

Ericsson; "Impact on Random Access due to LBT"; 3GPP TSG-RAN WG2 #94, Tdoc R2-164009; Nanjing, P.R. China; May 23-27, 2016 (9 Pages).
International Search Report issued in International Application No. PCT/JP2017/017522, dated Aug. 1, 2017 (5 pages).
Written Opinion of the International Searching Authority issued in International Application No. PCT/JP2017/017522, dated Aug. 1, 2018 (4 pages).
Tatsuhiko Yoshihara, et al., "Radio Equipment and Antennas for Advanced C-RAN Architecture"; NTT DOCOMO Technical Journal vol. 17, No. 2; Internet <URL: https://www.nttdocomo.co.jp/corporate/Technology/rd/technicaljournal/bn/vol23_2/005.html>; Jul. 2015 (12 pages).
Office Action in counterpart European Patent Application No. 17802564.9 dated Jun. 11, 2021 (8 pages).
3GPP TSG-RAN WG2 Meeting #83; R2-132834 "Way Forward on the Selection of UP Architecture Alternatives" Huawei, HiSilicon; Barcelona, Spain; Aug. 19-23, 2013 (7 pages).
3GPP TSG RAN WG2 Meeting #81bis; R2-131954 "Discussion on Protocol Stack Support in Small Cell eNB" Research in Motion, UK Limited; Fukuoka, Japan; May 20-24, 2013 (7 pages).
Decision of Refusal issued in Japanese Application No. 2018-519172; dated Sep. 14, 2021 (6 pages).

* cited by examiner

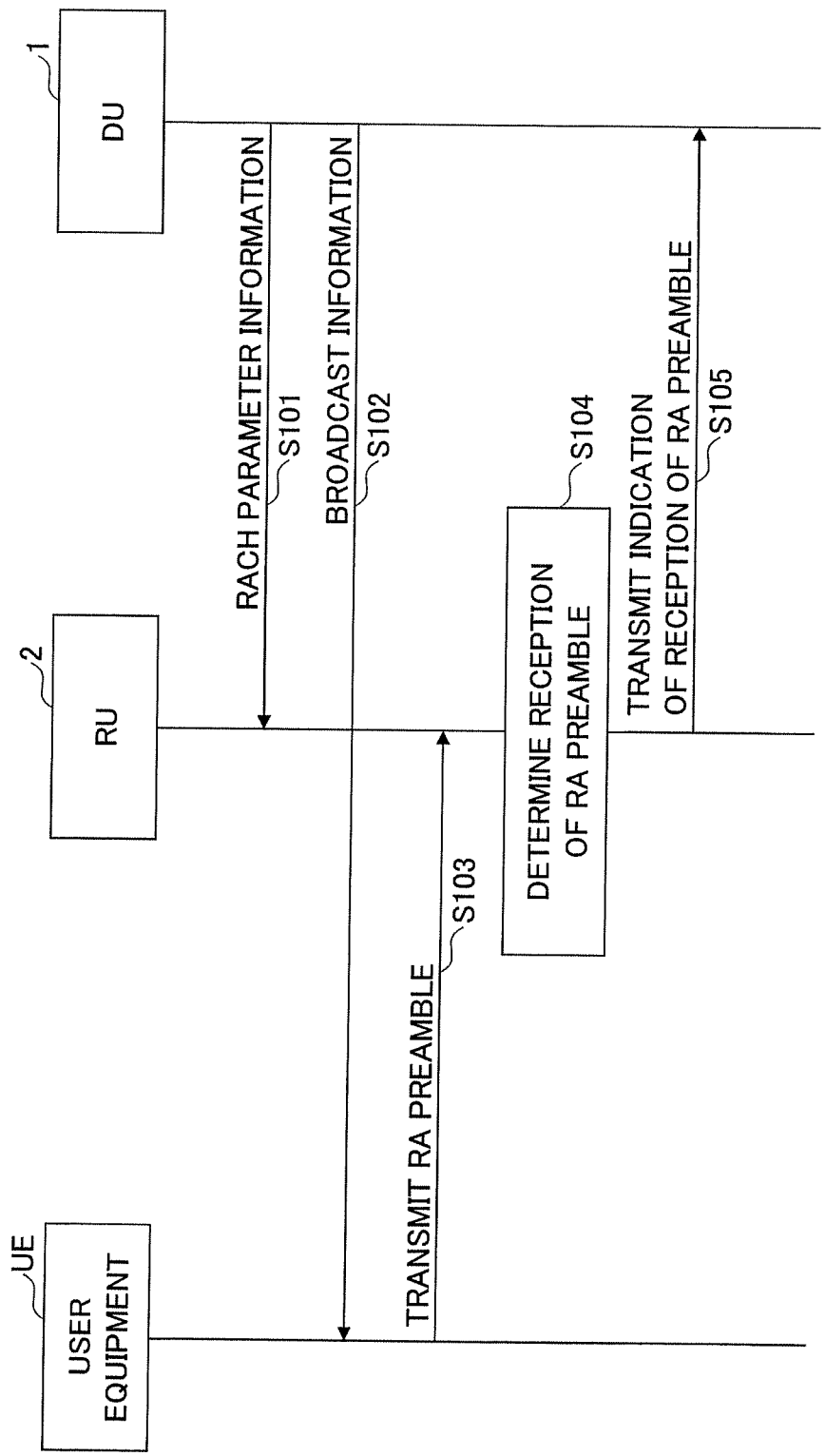

FIG.5

| RACH PARAMETER INFORMATION |
|---|
| FORMAT INFORMATION OF RA PREAMBLE |
| FREQUENCY RESOURCE INFORMATION OF PRACH |
| TIME RESOURCE INFORMATION OF PRACH |
| SEQUENCE INFORMATION OF RACH |
| BASEBAND CONFIGURATION INFORMATION OF RACH |
| PREAMBLE REPETITION NUMBER |
| PRACH TRANSMISSION START SUBFRAME |
| INITIAL VALUE OF CE LEVEL |
| PREAMBLE INFORMATION FOR CONTENTION-BASED RA PROCEDURE |
| INFORMATION ON RA PREAMBLE GROUP A/B |
| INFORMATION ON RA PREAMBLE GROUP (FOR EACH CE LEVEL) |
| POWER RAMPING UNIT INFORMATION |
| MAXIMUM NUMBER OF TIMES OF RE-TRANSMISSION OF PREAMBLE |
| RACH RESPONSE RECEPTION WINDOW SIZE |
| MAC CONTENTION RESOLUTION TIMER VALUE |
| MAXIMUM NUMBER OF TRANSMISSIONS ON HARQ OF Msg 3 |
| PREAMBLE INFORMATION FOR NON-CONTENTION-BASED RA PROCEDURE |
| RACH Mask Index INFORMATION |
| TARGET RECEPTION POWER OF RACH |
| DEDICATED PREAMBLE WAITING TIMER VALUE |

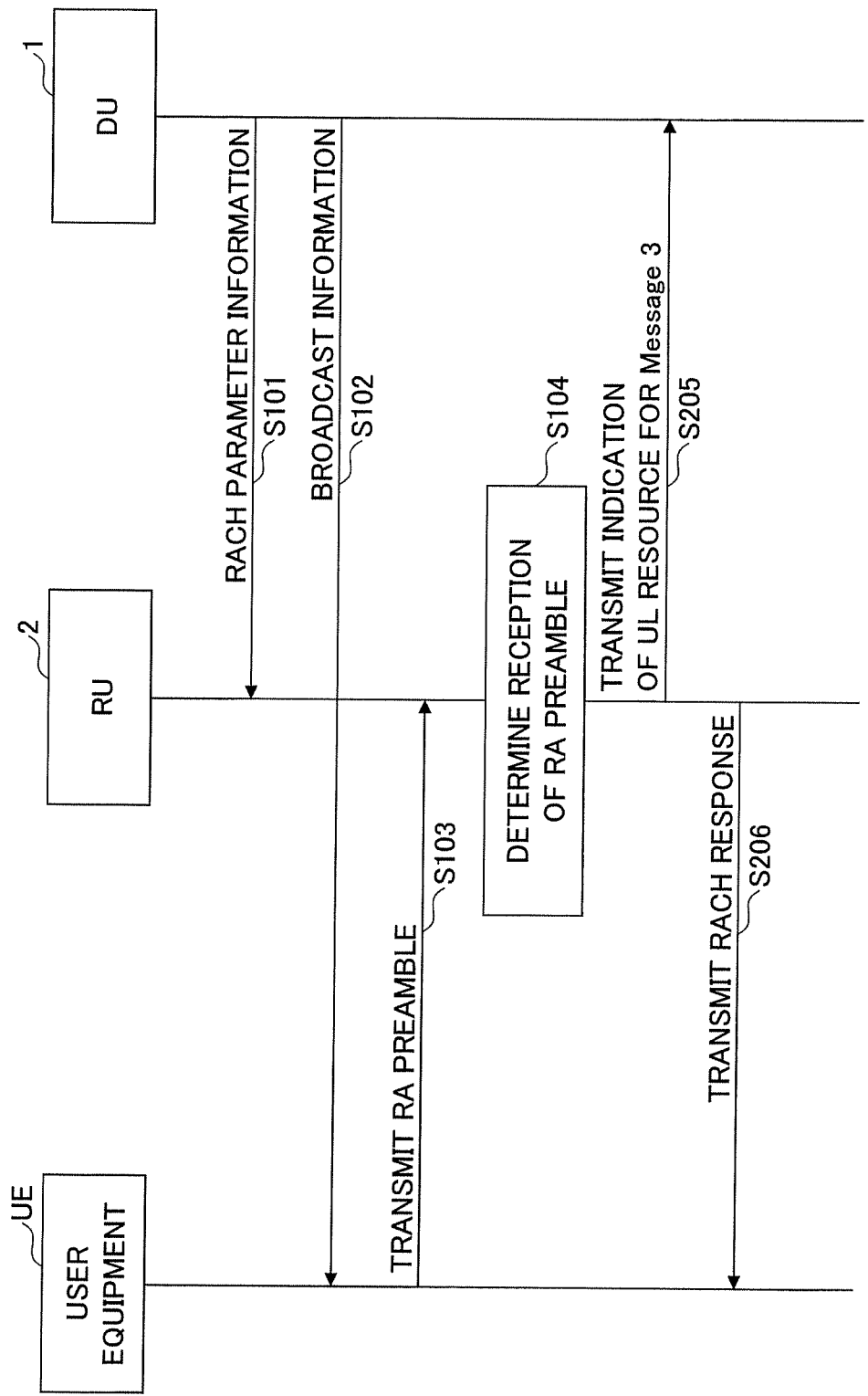

COMMUNICATION DEVICE AND RANDOM ACCESS CONTROL METHOD

TECHNICAL FIELD

The present invention relates to a communication device and a random access control method.

BACKGROUND ART

In a wireless communication system of long term evolution (LTE) and LTE-Advance (LTE-A), in order to efficiently support an area like a hot spot with high traffic, a technique called a centralized radio access network (C-RAN) capable of accommodating a large number of cells while reducing device costs is known.

The C-RAN is configured with one or more radio units (RUs) which are remote-installed base stations and a digital unit (DU) which is a base station for centrally controlling the RUs. The DU has the functions of Layer 1 to Layer 3 provided in the base station, and an orthogonal frequency division multiplexing (OFDM) signal generated by the DU is sampled and transmitted to the RUs and is transmitted from a radio frequency (RF) function unit provided in the RU.

CITATION LIST

Non-Patent Document

Non-Patent Document 1: "Development of Radio Equipment and Antennas Implementing Advanced C-RAN Architecture", July 2015, NTT Docomo, Internet <URL: https://www.nttdocomo.co.jp/corporate/Technology/rd/technical_journal/bn/vol 23_2/005.html>

SUMMARY OF THE INVENTION

Problem to be Solved by the Invention

Next, the C-RAN configuration that has been studied in 5G will be described. In FIG. 1, 4G-DU and 4G-RU denote a DU and an RU having functions of LTE-A (including the function of LTE), respectively. In addition, 5G-DU and 5G-RU denote a DU and an RU having functions of the fifth generation radio technology, respectively. The 4G-DU and the 5G-DU are connected by using an interface that extends the X2-AP and X2-U interfaces in LTE. In addition, a network line connecting the DU and the RU is referred to as a front haul (FH), and in the LTE, a common public radio interface (CPRI) is used for the FH.

In the current LTE, the functions of Layer 1 (physical layer: L1), Layer 2 (MAC, RLC, PDCP), and Layer 3 (RRC) are assumed to be implemented on the DU side. Therefore, the bandwidth required for the FH is about 16 times the peak rate supported by the DU. For example, in a case where the system band is 20 MHz and the DU supports 2×2 MIMO (Multi Input Multi Output) wireless communication (maximum 150 Mbps), the bandwidth required for the FH is about 2.4 Gbps.

In the 5G that has been currently studied, a peak rate of 10 Gbps or more and a further low delay will be realized. Therefore, if the 5G is introduced, the band required for the FH dramatically increases as the peak rate improves. Therefore, it has been studied that the amount of information transmitted by the FH is to be reduced by allowing a portion of the layers implemented in the DU to be implemented on the RU side. Many variations as to which functions of layer are to be implemented on the RU side can be considered. As an example, a plan to implement all or some of the functions of Layer 1 of the DU in the RU, a plan to implement a portion of Layer 1 and Layer 2 on the RU side, or the like has been studied.

Herein, a user equipment performs a random access (RA) procedure in the case of establishing connection with the base station. Since the RA procedure is performed by cooperating the functions of Layer 1 to Layer 3, in a case where a portion the layers implemented in the DU are implemented on the RU side, the RA procedure is performed by allowing the DU and the RU to cooperate with each other. However, in the current situation, the 3GPP does not regulate a specific processing procedure when the RA procedure is performed by allowing the DU and the RU to cooperating with each other.

The disclosed technology is made in consideration of the above-described problems, and an object of the present invention to provide a technology capable of performing an RA procedure by allowing a DU and an RU to cooperate with each other.

Means for Solving the Problem

According to an embodiment of the present invention, there is provided is a communication device used as a first communication device in a wireless communication system including the first communication device, a second communication device communicating with the first communication device, and a user equipment communicating with the first communication device, the communication device including: an acquisition unit configured to acquire a parameter used for performing a random access procedure from the second communication device; and a control unit configured to transmit, in the case of receiving a random access preamble from the user equipment in a random access channel indicated by the parameter, information indicating that the random access preamble indicated by the parameter is received from the user equipment to the second communication device.

Effect of the Invention

According to the disclosed technique, there is provided a technique capable of performing the RA procedure by allowing the DU and the RU to cooperate with each other.

BRIEF DESCRIPTION OF DRAWINGS

FIG. 4 is a sequence diagram illustrating an example of a processing procedure performed by the wireless communication system according to the embodiment;

FIG. 5 is a diagram illustrating an example of RACH parameters;

FIG. 6 is a sequence diagram illustrating an example of a processing procedure (Modified Example) performed by the wireless communication system according to the embodiment;

MODE(S) FOR CARRYING OUT THE INVENTION

Figure 1:
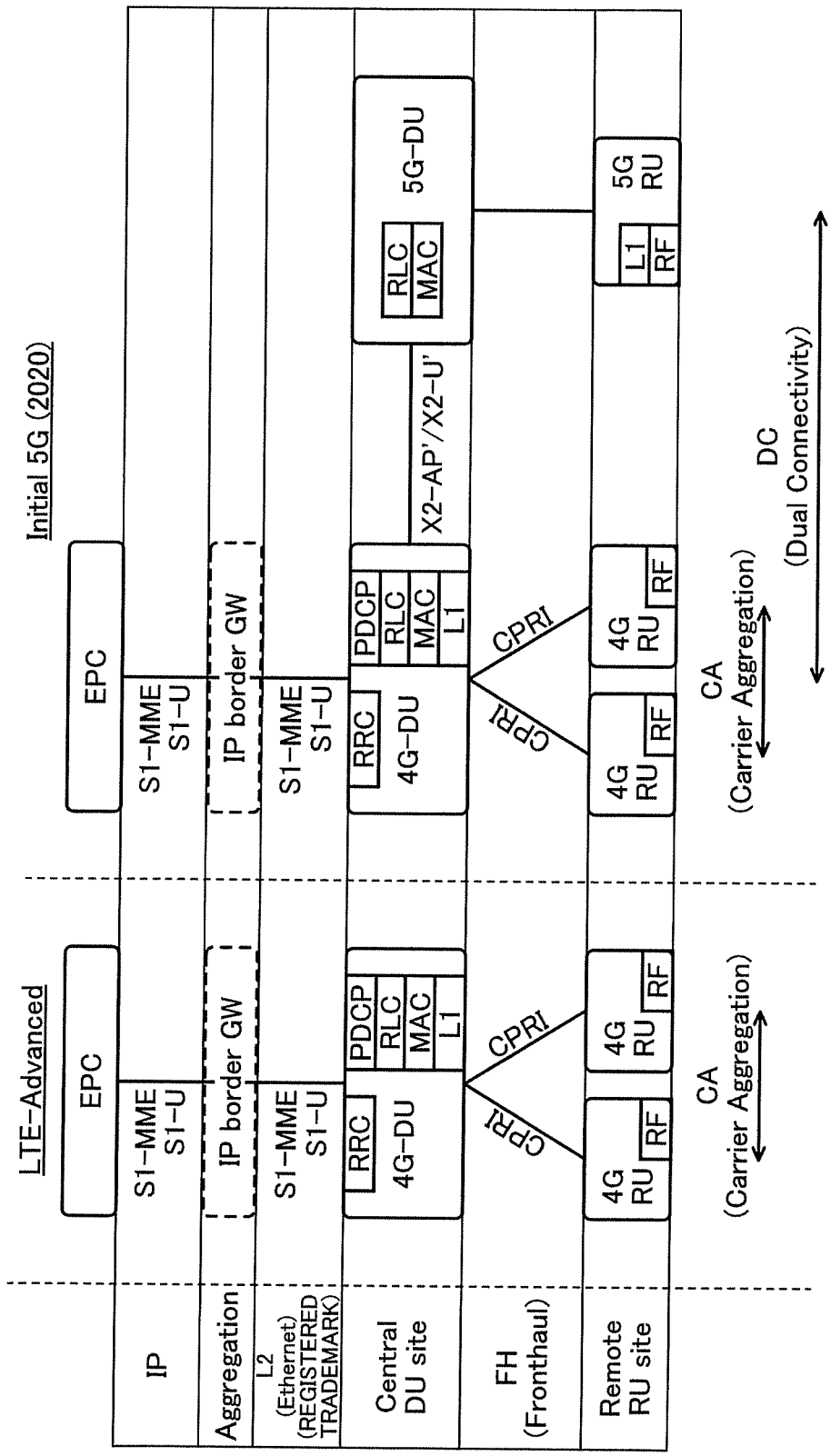
FIG. 1 is a diagram illustrating a configuration example of a C-RAN that has been studied in 5G.

Hereinafter, embodiments of the present invention will be described with reference to the drawings. The embodiments described hereinafter are merely exemplary ones, and the embodiments to which the present invention is applied are not limited to the following embodiments. For example, although it is assumed that the wireless communication system according to the embodiment is a system based on the LTE, the present invention is not limited to the LTE, but the present invention can be applied to other systems. In the specification and the claims, unless otherwise noted, the term "LTE" is used in a broad sense including not only to the communication method corresponding to 3GPP Release 8 or 9 but also to the fifth generation (5G) communication method corresponding to 3GPP Release 10, 11, 12, 13, 14 or later.

"Layer 1" is synonymous with a "physical layer". Layer 2 is configured to include a medium access control (MAC) sublayer, a radio link control (RLC) sublayer, and a packet data convergence protocol (PDCP) sublayer. Layer 3 is synonymous with a radio resource control (RRC) layer.

<RA Procedure in LTE>

Herein, the RA procedure regulated in LTE will be described. Before starting the RA procedure, the user equipment UE performs radio frame synchronization (including symbol timing synchronization) by receiving a synchronization signal transmitted from the base station eNB and acquires system bandwidth, system frame number (SFN), various information on the cells, and various parameters required for performing the RA procedure by receiving broadcast information (master information block (MIB) and system information block (SIB).

In the RA procedure, a contention-based RA procedure and a non-contention-based RA procedure are regulated.

In the case of a contention-based RA procedure, the user equipment UE randomly selects an arbitrary RA preamble from the plurality of RA preambles allocated for the contention-based RA procedure and transmits the selected RA preamble to the base station eNB. A message that the user equipment UE uses to transmit the RA preamble is referred to as Message 1. The plurality of RA preambles allocated for the contention-based RA procedure are further divided into groups A and B. The user equipment UE can select an RA preamble from one of the groups according to the size of the message to be transmitted. By determining whether the received RA preamble belongs to the group A or belongs to the group B, the base station eNB can roughly grasp the magnitude of the size of the message that the user equipment UE desires to transmit.

Subsequently, the base station eNB detects the RA preamble transmitted from the user equipment UE and transmits a random access channel (RACH) response to the user equipment UE. The RACH response is referred to as Message 2 and includes an index (RAPID: random access preamble IDentitfier) of the detected RA preamble, a temporary UE-ID ((temporary cell radio network temporary identifier (temporary C-RNTI)), timing alignment information (Transmission Timing information), UL (Uplink) scheduling information (UL grant for transmission of Message 3), and a back-off indicator.

Subsequently, the user equipment UE transmits a Control message to the base station according to the transmission timing information calculated from the RACH response by using a radio resource specified by UL scheduling information included in the RACH response. The Control message is also referred to as Message 3 and includes a signal of the higher layer (RRC). In addition, the user equipment UE transmits a Control message including a terminal identifier (UE Contention Resolution Identity) to the base station eNB by using the temporary UE-ID included in the RACH response.

Subsequently, the base station eNB receives the Control message by using the temporary UE-ID (temporary C-RNTI) and transmits an RRC message (RRC Connection setup or RRC Connection Reestablishment) for RRC connection or RRC reconnection to the user equipment UE. This RRC message is also referred to as Message 4. Herein, the base station eNB allows the RRC message to include the terminal identifier (UE Contention Resolution Identity) included in the Control message and transmits the RRC message. In addition, in the case of receiving Control messages from a plurality of user equipments UE, the base station eNB selects a Control message from one of the user equipments UE and transmits an RRC message including a UE Contention Resolution Identity included in the selected Control message.

In a case where the terminal identifier included in the Control message is contained in the RRC message, the user equipment UE determines that the user equipment UE itself has succeeded in the RA procedure. In a case where the terminal identifier is not included in the Control message, the user equipment UE determines that the user equipment UE has failed in the RA procedure (another user equipment UE and the RA procedure contend with each other).

Subsequently, the user equipment UE that determines to have succeeded in the RA procedure starts transmission/reception of data with respect to the base station eNB by using a shared channel. In addition, the user equipment UE regards the temporary UE-ID (temporary C-RNTI) as a UE-ID (C-RNTI) allocated to itself. On the other hand, the user equipment UE that determines to have failed in the RA procedure increases transmission power at the time of transmitting the RA preamble and performs the process of transmitting the RA preamble to the base station again. This process is referred to as transmission power control (power ramping).

In the case of the non-contention-based RA procedure, the user equipment UE transmits an RA preamble (dedicated preamble) designated in advance from the base station eNB to the base station eNB (Message 1). Subsequently, the base station eNB detects the RA preamble transmitted from the user equipment UE and transmits an RACH response to the user equipment UE (Message 2). After that, the establishment of the RRC connection or the like is performed between the user equipment UE and the base station eNB.

Herein, an RA procedure performed by an MTC terminal called a category M1 capable of performing communication by using a limited bandwidth corresponding to 6 resource blocks (RBs) regulated in Release 13 will be described. This MTC terminal supports repetition transmission in order to expand coverage and to enable communication over a wide range. This MTC terminal is referred to as a BL (Bandwidth reduced Low complexity) UE or a UE (User Equipment) in CE (Coverage Enhancement) in Layer 2 and Layer 3. In addition, in Layer 1, the MTC terminal is referred to as a BL/CE UE. In the following description, the MTC terminal will be described as a "BL/CE UE" for the convenience.

Before starting the RA procedure, the BL/CE UE determines a CE level (among four levels from 0 to 3, the level with the widest coverage extension range is 3) indicating the extent of the coverage extension range. An initial value (initial-CE-level) of the CE level is notified from the base station eNB through broadcast information, or in a case where the initial value is not notified through the broadcast information, the user equipment UE itself determines the initial value according to a measurement result of the received power (RSRP) in the serving cell (current cell). Information (PreambleMappingInfo) indicating the RA preamble for the contention-based RA procedure, frequency and time resources (prach-ConfigurationIndex, prach-FrequencyOffset) of the PRACH (Physical Random Access Channel), the number of times when the RA preamble is to be repetitively transmitted (numRepetitionPerPreambleAttempt), and the number of times of repetitive transmission of the RA preamble (maxNumPreambleAttemptCE) and are notified in advance through broadcast information for each CE level.

The BL/CE UE selects an arbitrary RA preamble from a plurality of RA preamble candidates corresponding to the decided CE level and transmits the selected RA preamble to the base station eNB repetitively the number of times corresponding to the CE level. In a case where the RACH response cannot be received from the base station eNB (more specifically, in a case where the RACH response cannot be received within a window period set by the broadcast information), the BL/CE UE transmits the RA preamble to the base station eNB repetitively for the number of times corresponding to the CE level, which corresponds to the number of re-transmittable times of transmission of the RA preamble regulated for each CE level. However, in a case where the RACH response cannot be received from the base station eNB, the BL/CE UE switches to the next CE level (the next wider coverage extension range) and performs transmission of the RA preamble.

Since the RA procedure performed by the BL/CE UE after receiving the RACH response is basically the same as a normal user equipment UE, the description will be omitted.

<System Configuration>

Figure 2:
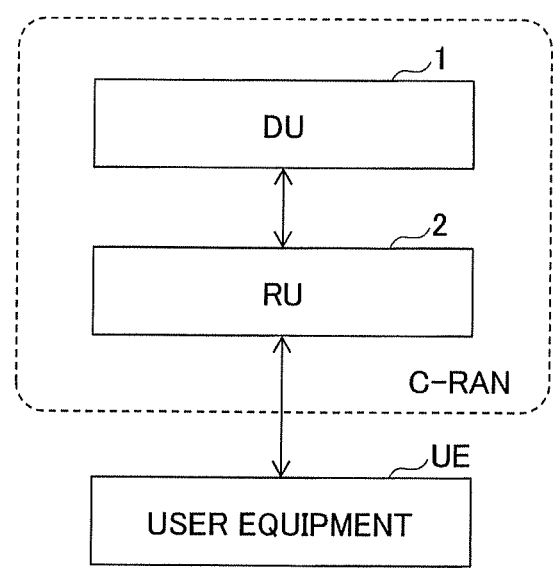
FIG. 2 is a diagram illustrating a system configuration example of a wireless communication system according to an embodiment.

FIG. 2 is a diagram illustrating a system configuration example of the wireless communication system according to the embodiment. As illustrated in FIG. 2, the wireless communication system according to the embodiment is configured to include a DU 1, an RU 2, and a user equipment UE. Although one RU 2 is illustrated in FIG. 2, two or more RUs 2 may be included. Namely, the DU 1 may be configured to control a plurality of the RUs 2.

The DU 1 may be referred to as a central digital unit, may be referred to as a baseband unit (BBU), or may be referred to as a central unit (CU. In addition, the DU 1 may be referred to as a central base station or may be simply referred to as a base station (eNB: enhanced Node B).

The RU 2 may be referred to as a remote radio unit (RRU), may be referred to as a remote antenna unit (RAU), or may be referred to as a remote radio head (RRH). In addition, the RU 2 may be referred to as a remote base station or may be simply referred to as a base station.

The user equipment UE is not limited to the MTC terminal. The user equipment is any terminal, but the user equipment includes a BL/CE UE unless otherwise mentioned.

In the wireless communication system according to the embodiment, a predetermined signal is transmitted and received between the DU 1 and the RU 2 through the FH, and a portion of the functions of the layer of the DU 1 is realized by the RU 2.

<Function Sharing of DU and RU>

Figure 3:
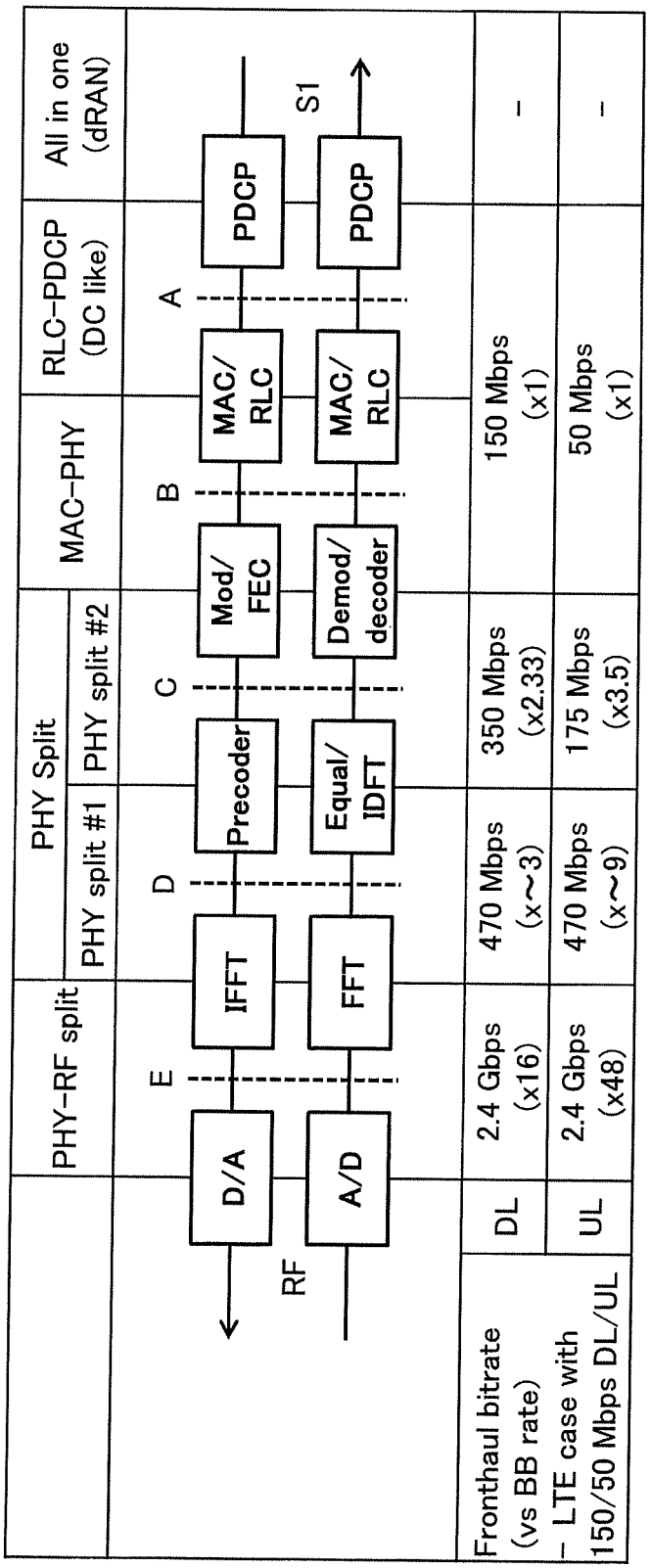
FIG. 3 is a diagram for explaining a function sharing example of a DU and an RU.

FIG. 3 is a diagram for explaining a function sharing example of DU and RU. Boundaries "A" to "E" in FIG. 3 indicate boundaries of the functions respectively implemented in the DU 1 and the RU 2. For example, a case where the function sharing is performed at the boundary "B" denotes that each function of Layer 2 or higher is implemented on the DU 1 side and each function of Layer 1 is implemented on the RU 2 side. In addition, a case where the function sharing is performed at the boundary "E" corresponds to a configuration where the function of Layer 1 or higher is implemented on the DU 1 side and the DU 1 and the RU 2 are connected by using the CPRI.

In addition, FIG. 3 illustrates an example of a bit rate required for the FH at each boundary. For example, it is assumed that the DU 1 supports 150 Mbps (DL: Downlink)/50 Mbps (UL: Uplink). In this case, in a case where the function sharing is performed at the boundary "A" or "B", the bandwidth required for the FH is 150 Mbps (DL)/50 Mbps (UL). In addition, in a case where the function sharing is performed at the boundary "C", the bandwidth required for the FH is 350 Mbps (DL)/175 Mbps (UL). Similarly, in a case where the function sharing is performed at the boundary "D", the bandwidth required for the FH is 470 Mbps (DL)/470 Mbps (UL). On the other hand, in a case where the function sharing is performed at the boundary "E", the bandwidth required for the FH is 2.4 Gbps (DL)/2.4 Gbps (UL).

The wireless communication system according to the embodiment may be configured to support the function sharing at any one of the boundaries "A" to "E", and may be further configured to support the function sharing at the boundary different from the UL and the DL. In addition, the function sharing between the DU and the RU is not limited to the example in FIG. 3, but any function sharing may be used.

<Processing Procedure>

(Sequence)

FIG. 4 is a sequence diagram illustrating an example of a processing procedure performed by the wireless communication system according to the embodiment. The processing procedure for performing the RA procedure by allowing the DU and the RU to cooperating with each other will be described with reference to FIG. 4.

First, the DU 1 transmits information (hereinafter, referred to as "RACH parameter information") including various parameters (referred to as "RACH parameters") used for performing the RA procedure to the RU 2 (S101). Subsequently, the DU 1 transmits broadcast information (MIB and SIB) including the RACH parameter or an RRC dedicated message to the user equipment UE (S102). The user equipment UE acquires the RACH parameter for performing the RA procedure by receiving the broadcast information or the RRC dedicated message. In addition, in the RRC dedicated message, parameters related to the dedicated preamble are notified.

In addition, the processing procedure of step S101 may be performed at a regular interval. Namely, the DU 1 may transmit the RACH parameter information to the RU 2 at a predetermined period. In addition, the DU 1 may transmit the RACE parameter information at the time of cell start-up and, after that, may transmit the RACH parameter information to the RU 2 in a case where a change occurs in the RACH parameter. In addition, instead of transmitting the RACH parameter information from the DU 1, the RACH parameter information may be directly set to the RU 2 through an external interface or the like provided in the RU 2. In addition, the RACH parameter information is divided into a plurality of parameters and may be notified from the DU 1 to the RU 2 at different timings. For example, the RACH parameter information may be divided into parameters related to the dedicated preamble and other parameters.

In addition, the processing procedure of step S101 and the processing procedure of step S102 may be common. Namely, since the broadcast information transmitted from the DU 1 to the user equipment UE is transmitted through the RU 2, the RU 2 may extract necessary RACH parameters from the broadcast information transmitted in the process procedure of step S102.

Subsequently, the user equipment UE starts the RA procedure and transmits an RA preamble (also referred to as an RACH preamble) to the base station eNB (S103). In the case of receiving (detecting) the RA preamble transmitted from the user equipment UE, the RU 2 determines whether the received (detected) RA preamble is appropriate (S104). Subsequently, in a case where the RU 2 determines that the received RA preamble is appropriate, the RU 2 transmits information (hereinafter, referred to as "RA preamble reception notification") indicating that the RA preamble has been received from the user equipment to the DU 1 (S105). In addition, in a case where the RU 2 determines that the received RA preamble is not appropriate, the RU 2 may notify to the DU 1 the message indicating that the received RA preamble is not appropriate, or the RU may not particularly notify the message.

(RACH Parameters)

FIG. 5 is a diagram illustrating an example of RACH parameters. The RACH parameters used for performing the RA procedure in RU 2 will be described with reference to FIG. 5.

The "format information of RA preamble" is information indicating the format of the RA preamble and includes, for example, the length of a subframe used for transmission of one RA preamble, the length of CP (Cyclic Prefix), and the length of guard time. The "RA preamble format" for the BL/CE UE is set for each CE level. The parameters included in the "format information of RA preamble" are uniquely determined by the preamble format (0 to 4) determined by the PRACH configuration index from 0 to 63 in LTE.

The "frequency resource information of PRACH" is information indicating frequency resources used for transmission of the RA preamble and includes, for example, a bandwidth (fixed at 6 RB in LTE) and a frequency offset position (position from the bottom of the system bandwidth). The "RACH configuration information in frequency direction" for the BL/CE UE is set for each CE level.

The "time resource information of PRACH" is information indicating a time resource allowed to transmit an RA preamble and includes, for example, an SFN number (even number, odd number, or an arbitrary number in LTE) and a subframe number. The "transmission timing information of PRACH" for the BL/CE UE is set for each CE level. The parameters included in the "time resource information of PRACH" are uniquely determined by the PRACH configuration index from 0 to 63 in LTE.

The "sequence information of RACH" is information for generating RA preamble series of the RA preamble and includes, for example, a sequence length, a route sequence number, a cyclic shift unit, and high speed information.

In addition, the route sequence number may be specified by a physical route sequence number used for generating the RA preamble series or may be specified by the logical route sequence number according to the correspondence table where the physical route sequence number and the logical route sequence number are in correspondence with each other. In addition, in the correspondence table where the physical route sequence number and the logical route sequence number in a predetermined range are in correspondence with each other, the route sequence number may be specified by the initial logical route sequence number in the predetermined range and the number of route sequences used for generating the RA preamble series. For example, in a case where the physical route sequence numbers that are in correspondence with the logical route sequence numbers (816 to 819) in the predetermined range are 367, 472, 296, and 543, respectively, 816 as the initial logical route sequence number in the predetermined range may be notified, and 3 as the number of route sequences used for generating the RA preamble series may be notified. In this case, the physical route sequence numbers used for generating the RA preamble series are recognized as 367, 472, and 296. In addition, as the "sequence information of RACH", only the length of the RA preamble and the value of the cyclic shift may be notified to the RU 2, and the RU 2 may calculate the physical route sequence number on the basis of the length of the RA preamble and the value of the cyclic shift.

The "baseband configuration information of RACH" is information used for converting a signal of the RA preamble in the frequency domain generated by the "sequence information of RACH" into a signal in the time domain and includes a subcarrier interval in the RA preamble. The subcarrier interval is uniquely determined in the preamble format (0 to 4) in LTE and is 1250 Hz in the formats 0 to 3 and 7500 Hz in the format 4.

The "preamble repetition number" is a parameter for the BL/CE UE and is information on the number of times when the RA preamble is to be repetitively transmitted for each CE level.

The "PRACH transmission start subframe" is a parameter for the BL/CE UE and is information indicating the subframe number where the initial RA preamble is transmitted when the RA preamble is repetitively transmitted.

The "initial value of CE level" is a parameter for the BL/CE UE and is information indicating the above-described initial value of the CE level.

The "preamble information for contention-based RA procedure" is information indicating which RA preamble is used for the contention-based RA procedure among all RA preambles.

The "information on RA preamble group A/B" includes the RA preamble belonging to the RA preamble group A among the plurality of RA preambles for the contention-based RA procedure, the message size threshold value in a case where the RA preamble group A is selected, and the power offset in a case where the RA preamble group B is selected. In addition, the message size threshold value in a case where the RA preamble group A is selected and the power offset in a case where the RA preamble group B is selected are information used on the user equipment UE side, and since the RU 2 does not particularly need to grasp the message size threshold value and the power offset, the message size threshold value and the power offset may be not included in the RACH parameter information.

The "information on the RA preamble group (for each CE level)" is a parameter for the BL/CE UE and is information indicating which RA preamble among the plurality of RA preambles indicated by "preamble information for contention-based RA procedure" is mapped to which CE level.

The "power ramping unit information" is a parameter used for the above-described transmission power control and is information indicating to what extent the transmission power needs to be increased when the user equipment UE performs the RA procedure again. In addition, the "power ramping unit information" is information used by the user equipment UE side, and since the RU 2 does not particularly need to grasp the power ramping unit information, the power ramping unit information may be not included in the RACH parameter information.

The "maximum number of times of re-transmission of preamble" is information indicating the maximum number of times when re-transmission of the RA preamble can be performed in a case where it is determined that the user equipment UE cannot receive the RACH response or that the RA procedure has failed (contention of the RA procedure with another user equipment UE). In addition, the "maximum number of times of re-transmission of preamble" for the BL/CE UE is set for each CE level.

The "RACH response reception window size" is information indicating a period (window size) during which the user equipment UE that has transmitted the RA preamble needs to monitor the PDCCH (MPDCCH (MTC PDCCH) in the case of the BL/CE UE)) for reception of the RACH response. The "RACH response reception window size" for the BL/CE UE is set for each CE level. In addition, the "RACH response reception window size" is information used by the user equipment UE side, and since the RU 2 does not particularly need to grasp the RACH response reception window size, the RACH response reception window size may be not included in the RACH parameter information.

The "MAC contention resolution timer value" is information indicating a period during which the user equipment UE that has transmitted Message 3 needs to monitor the PDCCH (MPDCCH in the case of BL/CE UE) for reception of Message 4. The "MAC contention resolution timer value" for the BL/CE UE is set for each CE level.

The "Maximum number of transmissions on HARQ of Msg 3" is information indicating the maximum number of times when transmission (including) re-transmission of the same data can be performed in the HARQ applied to Message 3. In addition, the "maximum number of transmissions on HARQ of Msg 3" is information used on the user equipment UE side, and since the RU 2 does not particularly need to grasp the maximum number of transmissions on HARQ of Msg 3, the maximum number of transmissions on HARQ of Msg 3 may be not included in the RACH parameter information.

The "preamble information for non-contention-based RA procedure" is information indicating a dedicated preamble allocated to the user equipment UE, and in the information, an index of the dedicated preamble allocated to the user equipment UE and a UE-ID (for example, C-RNTI) are in correspondence with each other.

The "RACH Mask Index information" is information indicating a time resource (subframe) of a PRACH through which the user equipment UE to which a dedicated preamble is allocated can transmit the dedicated preamble.

The "target received power of RACH" is information used for determining the transmission power when the user equipment UE transmits the RA preamble. In addition, the "target reception power of RACH" is information used by the user equipment UE side, and since the RU 2 does not particularly need to grasp the target reception power of RACH, the target reception power of RACH may be not included in the RACH parameter information.

The "dedicated preamble waiting timer value" is information indicating a period during which the RU 2 waits for the dedicated preamble allocated to the user equipment UE. In a case where the RU 2 cannot receive the dedicated preamble before the timer expires, the RU 2 determines that the dedicated preamble is not to be transmitted (for example, due to a factor such as moving to another cell) to the user equipment UE and operates to stop the waiting.

(Setting Value of RACH Parameter Information)

Actual values may be set as the setting values of various RACH parameters included in the RACH parameter information, or predefined index values may be set. In addition, instead of setting the setting value for each RACH parameter, predefined index values may be set for each combination of a plurality of RACH parameters.

(Determination Process of RA Preamble)

In step S104 of FIG. 4, in a case where the RU 2 receives (detects) the RA preamble transmitted from the user equipment UE, the RU 2 determines whether the received (detected) RA preamble is appropriate. More specifically, the RU 2 determines whether or not an RA preamble (an RA preamble generated according to the RACH parameter) indicated in the RACH parameter is received through the RACH indicated by the RACH parameter (through the frequency and time resources of the RACH indicated by the RACH parameter).

For example, the RU 2 may determine whether or not the received RA preamble is included in the range of the RACH resources (the frequency and time resources of the RACH) indicated by the RACH parameter, and in a case where the received RA preamble is not included in the range of the RACH resources indicated by the RACH parameter, the RU 2 may determines that that the received RA preamble is not appropriate.

In addition, for example, in the case of receiving the RA preamble from the BL/CE UE, if the RU 2 cannot receive the RA preamble corresponding to the number of times specified by the "preamble repetition number", the RU 2 may determine that the received RA preamble is not appropriate. Although the "preamble repetition number" is regulated for each CE level, since the RACH resource (the frequency and time resources of the RACH) is also regulated for each CE level, the RU 2 may determine how many times the RA preamble of the CE level has been received on the basis of the RACH resource at the time of receiving the RA preamble.

In addition, for example, in the case of receiving the RA preamble from the BL/CE UE, if the RU 2 cannot receive the RA preamble at a predetermined ratio (or a predetermined number of times) out of the times specified by the "preamble repetition number", the RU 2 may determine that the received RA preamble is not appropriate. For example, in a case where the "preamble repetition number" is set to 16 and the predetermined ratio is set to 50%, if the number of times when the RA preamble is received is less than 8, the RU 2 may determine that the received RA preamble is not appropriate. The predetermined ratio may be included in the RACH parameter information or may be directly set to the RU 2 through an external interface or the like provided in the RU 2.

In addition, with respect to the dedicated preamble, only in a case where the RA preamble specified by the "preamble information for non-contention-based RA procedure" can be received through the PRACH resource through which the dedicated preamble specified by the "Information of RACH Mask Index" can be transmitted during which the timer specified by the dedicated preamble waiting timer value expires, the RU 2 considers the RA preamble to be received. In addition, the timing of starting the dedicated preamble waiting timer may be the timing of receiving the notification that the dedicated preamble has been transmitted from the DU 1 to the user equipment UE or may be the timing at which the RACH preamble information including the "preamble information for non-contention-based RA procedure" is received from the DU 1.

(RA Preamble Reception Notification)

In step S105 of FIG. 4, in a case where the RU 2 determines that the received RA preamble is appropriate, the RU transmits an RA preamble reception notification to the DU 1. More specifically, the RU 2 allows the RA preamble reception notification to include "RAPID of the received RA preamble" and "information (Timing Alignment information) indicating the transmission timing of the UL to be instructed to the user equipment UE" and transmits the RA preamble reception notification to the DU 1. In the case of receiving the contention-type RA preamble from the user equipment UE, the RU 2 may allow the RA preamble reception notification to further include "temporary C-RNTI". In addition, in the case of receiving the dedicated preamble from the user equipment UE, the RU 2 may allow the RA preamble reception notification to further include the UE-ID (C-RNTI) of the user equipment UE and transmit the RA preamble reception notification to the DU 1. In addition, the information indicating the transmission timing of the UL may be, for example, a difference between the timing of the boundary of the DL (Downlink) subframe and the timing of receiving the RA preamble. In addition, the difference value may be represented an absolute value or may be represented by an index value determined on the basis of a predefined correspondence table.

The RU 2 may measure an RACH interference level (an interference level in the PRACH resource) and transmit the measured RACH interference level to DU 1. The RU 2 may allow the RA preamble reception notification to include the RACH interference level and transmit the RA preamble reception notification to the DU 1 or may transmit, to the DU 1, the RACH interference level as information separate from the RA preamble reception notification. In addition, the RU 2 may measure a reception quality (for example, an SIR) of the RA preamble and may allow the RA preamble reception notification to include the measured reception quality of the RA preamble and transmit the RA preamble reception notification to the DU 1.

In addition, in a case where the RU 2 has receive the RA preamble from the BL/CE UE, the RU 2 may allow the RA preamble reception notification to include the CE level corresponding to the received RA preamble and transmit the RA preamble reception notification to the DU 1.

In addition, the RU 2 may allow the RA preamble reception notification to include information (for example, an index of the RB in the frequency direction, an SFN, a subframe number, or the like) indicating the frequency and time resources of the RACH resource through which the RA preamble has been received and transmit the RA preamble reception notification to the DU 1.

The RACH interference level notified to the DU 1, the reception quality of the RA preamble, the information indicating the frequency and time resources of the RACH resources through which the RA preamble has been received may be represented an absolute value or may be represented by an index value determined on the basis of a predefined correspondence table.

<Modified Example of Processing Procedure>

Hereinafter, a modified example of the processing procedure will be described.

(Transmission of RACH Response)

In the processing procedure, the transmission of the RACH response is described with reference to FIG. 4 on the premise that the DU 1 performs the transmission, but the transmission of the RACH response may be performed by the RU 2.

FIG. 6 is a flowchart illustrating an example of the processing procedure (modified example) performed by the wireless communication system according to the embodiment. In addition, the same processing procedures as those in FIG. 4 are denoted by the same reference numerals, and the description thereof is omitted.

In a case where the RU 2 determines that the RA preamble received in the processing procedure of step S104 is appropriate, the RU 2 performs UL (uplink) resource allocation for transmission of Message 3 and transmits information indicating the resource for transmission of Message 3 to the DU 1 (S205). The information indicating the allocated resources includes information indicating the frequency and time resources of the allocated resources (for example, the index of the RB in the frequency direction, the SFN, the subframe number, or the like) and the UE-ID of the user equipment UE to which the resources are allocated. In a case where the RA preamble received by the RU 2 is a contention-based RA procedure, the UE-ID is a temporary RNTI paid out by the RU 2. In a case where the RA preamble received by the RU 2 is a dedicated preamble, the UE-ID is an RNTI paid out by the DU 1 (namely, a C-RNTI corresponding to the dedicated preamble specified by the "preamble information for non-contention-based RA procedure"). In addition, the information indicating the frequency and the time resources of the allocated resources may be represented an absolute value or may be represented by an index value determined on the basis of a predefined correspondence table. By using the information indicating the resource for transmission of Message 3 received from the RU 2, the DU 1 can perform UL scheduling so as to avoid the resource.

Subsequently, the RU 2 transmits an RACH response including an UL grant indicating the UL resource for transmission of Message 3 to the user equipment UE (S206). The RACH response transmitted by the RU 2 includes an RAPID of the RA preamble received by the RU 2, a UE-ID of the user equipment UE (temporary C-RNTI, C-RNTI, or the like), timing alignment information (transmission timing information) UL grant, and a back-off indicator. In addition, the RU 2 calculates the RA-RNTI used as the CRC mask of the PDCCH (MPDCCH in the case of the BL/CE UE) that transmits the RACH response on the basis of the frequency position and the subframe position of the RACH resource which the RA preamble has been received.

With the processing procedure described heretofore, the RU 2 can be configured to directly transmit the RACH response to the user equipment UE, and thus, it is possible to reduce the processing load on the DU 1 side.

(Congestion Status of RACH)

The RU 2 may monitor the congestion state of the RACH and transmit the back-off indicator calculated on the basis of the congestion state of the RACH to the DU 1 or the user equipment UE. The RU 2 may determine the congestion state of the RACH according to the number of received RA preambles and/or the number of RACH responses that cannot be transmitted. At the time of transmitting the calculated back-off indicator to the DU 1, the RU 2 may allow the RA preamble reception notification to include the back-off indicator and transmit the RA preamble reception notification or may transmit, to the DU 1, the back-off indicator as information separate from the RA preamble reception notification.

The back-off indicator may be represented an absolute value or may be represented by an index value determined on the basis of a predefined correspondence table.

The back-off indicator is used to determine the value of the back-off timer which is the time to delay the re-transmission of the RA preamble in the user equipment UE. Therefore, when calculating the value of the back-off indicator according to the congestion state of the RACH, the RU 2 can reduce the congestion of the RACH by increasing the value of the back-off indicator according to the congestion state.

(Target Reception Power of RACH)

The above-described "target received power of RACH" may be calculated by DU 1 according to the RACH interference level notified from RU 2 to DU 1 or may be calculated by RU 2 according to the RACH interference level to be notified to DU 1. The RACH interference level notified to the DU 1 or the target received power of the RACH may be represented an absolute value or may be represented by an index value determined on the basis of a predefined correspondence table.

<Functional Configuration>

(DU)

Figure 7:
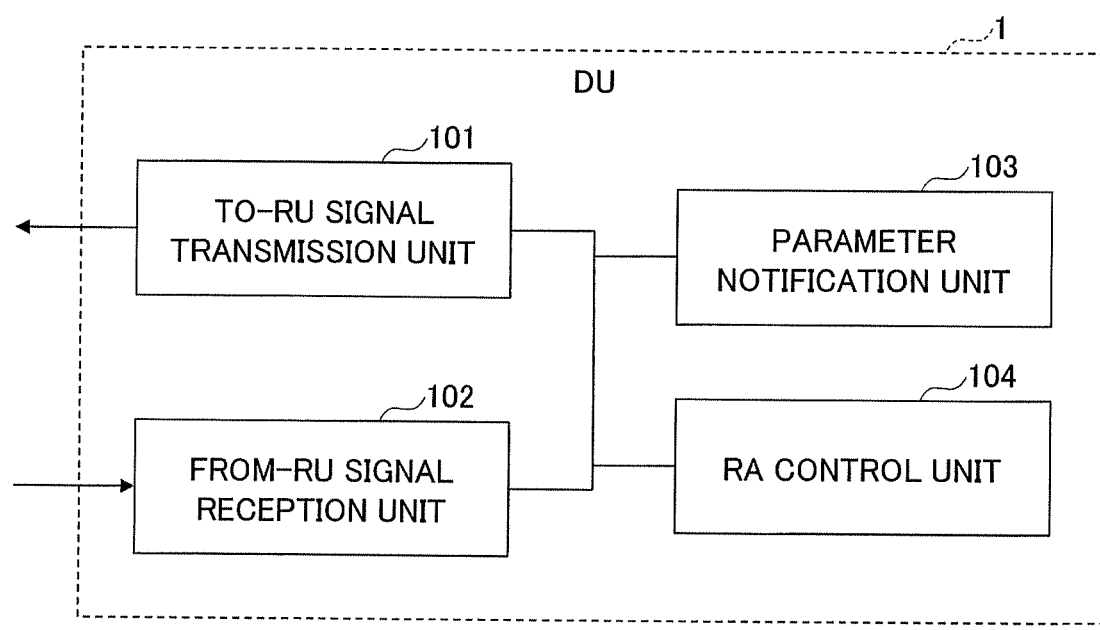
FIG. 7 is a diagram illustrating a functional configuration example of a DU according to the embodiment.

FIG. 7 is a diagram illustrating a functional configuration example of the DU according to the embodiment. As illustrated in FIG. 7, the DU 1 is configured to include a to-RU signal transmission unit 101, a from-RU signal reception unit 102, a parameter notification unit 103, and an RA control unit 104. In addition, FIG. 7 illustrates only functional units that are particularly relating to the embodiment in the DU 1, and thus, functions (not shown) for performing operations in accordance with at least the LTE (including 5G) may also be included. In addition, the functional configuration illustrated in FIG. 7 is merely an example. As long as the operation according to the embodiment can be executed, any functional division and any names of functional units may be available. However, a portion (for example, only a specific processing procedure or only a modified example) of the processes of the DU 1 described above may also be executed.

The to-RU signal transmission unit 101 has a function of generating a signal by performing processes of each layer on data to be transmitted from the DU 1 and transmitting the generated signal to the RU 2 through the FH. The from-RU signal reception unit 102 has a function of receiving the signal from the RU 2 through the FH and acquiring data by performing processes of each layer on the received signal. The to-RU signal transmission unit 101 and the from-RU signal reception unit 102 include functions as interfaces of a predetermined protocol used in the FH.

The parameter notification unit 103 has a function of transmitting the RACH parameter information to the RU 2. In addition, the parameter notification unit 103 may have a function of setting the RACH parameters to the user equipment UE by using the broadcast information and the RRC dedicated message.

The RA control unit 104 has a function of executing a random access procedure with respect to the user equipment UE. In addition, the RA control unit 104 may perform transmission of the RACH response, reception of Message 3, and transmission of Message 4 or may merely perform reception of Message 3 and transmission of Message 4.

(RU)

Figure 8:
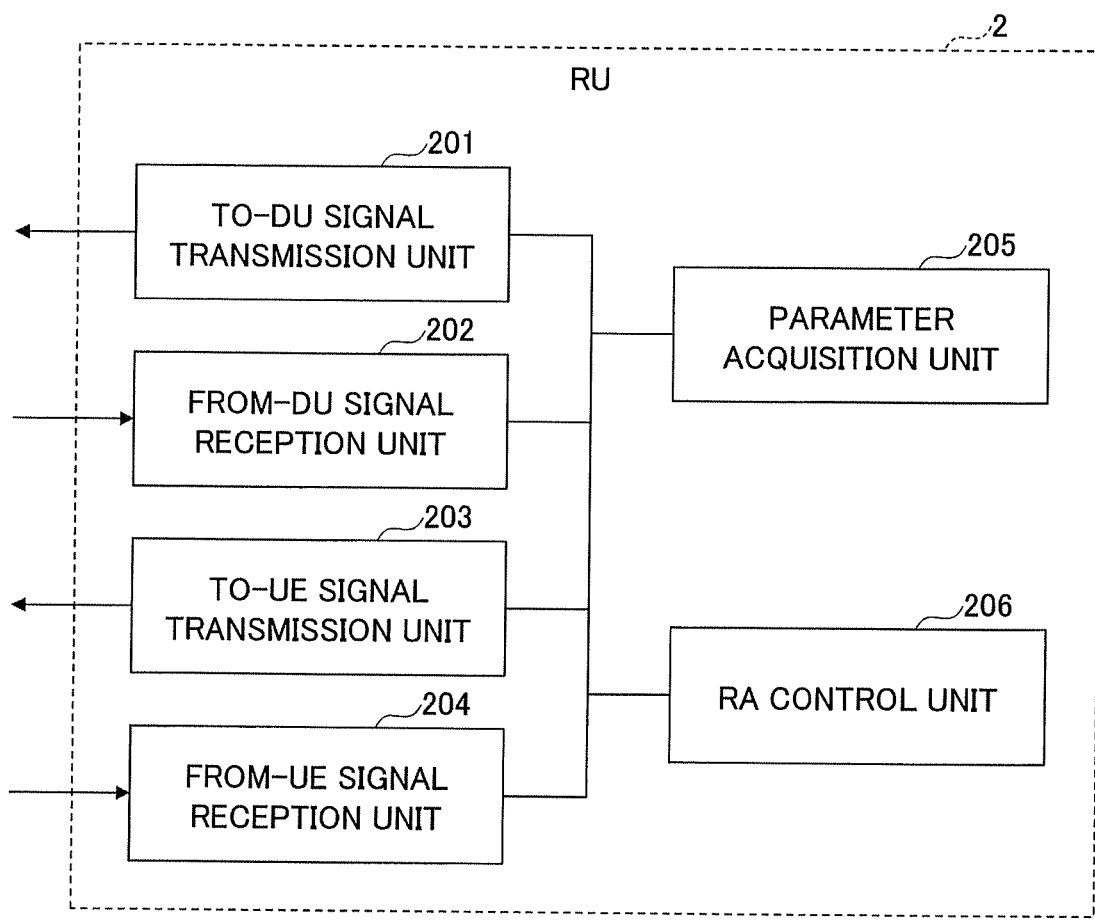
FIG. 8 is a diagram illustrating a functional configuration example of an RU according to the embodiment.

FIG. 8 is a diagram illustrating a functional configuration example of the RU according to the embodiment. As illustrated in FIG. 8, the RU 2 is configured to include a to-DU signal transmission unit 201, a from-DU signal reception unit 202, a to-UE signal transmission unit 203, a from-UE signal reception unit 204, a parameter acquisition unit 205, an RA control unit 206. In addition, FIG. 8 illustrates only functional units that are particularly relating to the embodiment in the RU 2, and thus, functions (not shown) for performing operations in accordance with at least the LTE (including 5G) may also be included. In addition, the functional configuration illustrated in FIG. 8 is merely an example. As long as the operation according to the embodiment can be executed, any functional division and any names of functional units may be available. However, a portion (for example, only a specific processing procedure or only a modified example) of the processes of the RU 2 described above may also be executed.

The to-DU signal transmission unit 201 has a function of transmitting a signal to be transmitted to the DU 1 to the DU 1 through the FH. The from-DU signal reception unit 202 has a function of receiving the signal from the DU 1 through the FH. The to-DU signal transmission unit 201 and the from-DU signal reception unit 202 include functions as interfaces of a predetermined protocol used in the FH.

The to-UE signal transmission unit 203 has a function of generating a radio signal from the signal received by the from DU signal reception unit 202 and transmitting the radio signal to the user equipment UE. The from-UE signal reception unit 204 has a function of receiving the radio signal from the user equipment UE, performing processes of a predetermined layer on the received radio signal, and transferring the processed signal to the to-DU signal transmission unit 201.

The parameter acquisition unit 205 has a function of acquiring, from the DU 1, the RACH parameter used for performing the random access procedure.

The RA control unit 206 has a function of performing processes related to the random access procedure. In addition, in the case of receiving the RA preamble indicated by the RACH parameter from the user equipment UE in the random access channel (RACH) indicated by the RACH parameter, the RA control unit 206 notifies, to the DU 1, information (RA preamble reception notification) indicating that RA preamble has been received from the user equipment UE.

In addition, in the case of receiving the dedicated preamble allocated to a specific user equipment UE before a predetermined timer (dedicated preamble waiting timer) expires, the RA control unit 206 may notify to the DU 1, the information indicating that the dedicated preamble allocated to the specific user equipment UE has been received from the specific user equipment UE.

In addition, in the case of receiving the RA preamble corresponding to the "number of times when a specific type of user equipment is to repetitively transmit an RA preamble" from the specific type of user equipment UE (BL/CE UE), the RA control unit 206 may notify, to the DU 1, the information indicating that the RA preamble has been received from the user equipment UE.

In addition, the RA control unit 206 may notify, to the DU 1, the information indicating that the RA preamble has been received from the user equipment UE with the ID of the received RA preamble and information indicating the transmission timing to be instructed to the user equipment UE included therein.

In addition, in the case of receiving the RA preamble indicated by the RACH parameter from the user equipment UE through the random access channel indicated by the RACH parameter, instead of the information indicating that the RA preamble has been received from the user equipment UE, the RA control unit 206 may notify, to the DU 1, the information indicating the radio resource through which Message 3 is transmitted from the user equipment UE and transmit, to the user equipment UE, a random access response message (RACH response) including the information indicating the radio resource through which Message 3 is transmitted.

<Hardware Configuration>

The block diagrams (FIGS. 7 and 8) used in the description of the above-described embodiment illustrate the blocks of functional units. These functional blocks (constituent units) are realized by arbitrary combination of hardware and/or software. In addition, means for implementing each functional block is not particularly limited. Namely, each functional block may be realized by one physically and/or logically combined device. Alternatively, two or more physically and/or logically separated devices may be directly and/or indirectly connected (for example, in a wired and/or wireless manner), and thus, each functional block may be realized by these plural devices.

Figure 9:
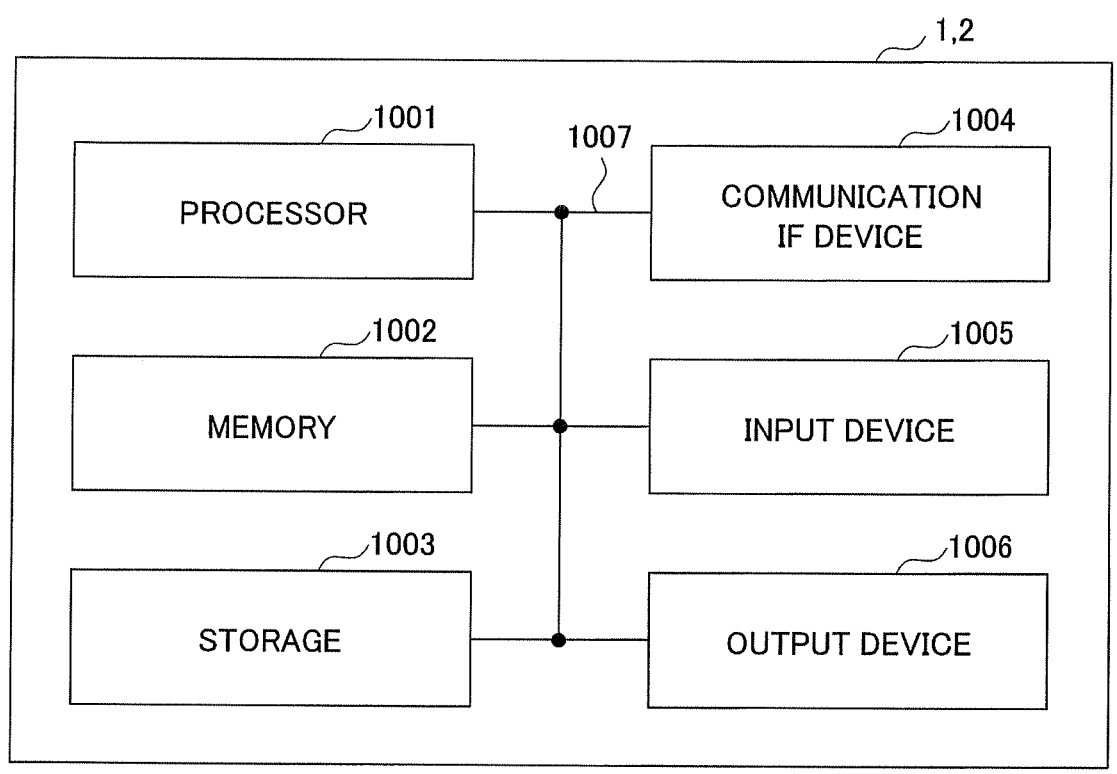
FIG. 9 is a diagram illustrating a hardware configuration example of a DU and an RU according to the embodiment.

For example, the DU 1 and the RU 2 in the embodiment may function as a computer that performs the processing of the random access control method according to the present invention. FIG. 9 is a diagram illustrating a hardware configuration example of the DU 1 and the RU 2 according to the embodiment. The DU 1 and the RU 2 described above may be physically configured as a computer device including a processor 1001, a memory 1002, a storage 1003, a communication IF device 1004, an input device 1005, an output device 1006, a bus 1007, and the like.

In addition, in the following description, the term "device" can be replaced with a circuit, a device, a unit, or the like. The hardware configuration of the DU 1 and the RU 2 may be configured to include one or a plurality of devices illustrated in the drawings or may be configured not to include some devices.

Each function in DU 1 and RU 2 is realized by allowing the processor 1001 to perform calculation by allowing predetermined software (programs) to be loaded on hardware such as the processor 1001 and the memory 1002 and controlling communication by the communication IF device 1004 and reading and/or writing of data in the memory 1002 and the storage 1003.

The processor 1001 operates, for example, the operating system to control the whole computer. The processor 1001 may be configured with a central processing unit (CPU) including an interface with a peripheral device, a control device, an arithmetic device, a register, and the like. For example, the to-RU signal transmission unit 101, the from-RU signal reception unit 102, the parameter notification unit 103, the RA control unit 104 of the DU 1 and the to-DU signal transmission unit 201, the from-DU signal reception unit 202, the to-UE signal transmission unit 203, the from-UE signal reception unit 204, the parameter acquisition unit 205, and the RA control unit 206 of the RU 2 may be realized by the processor 1001.

In addition, the processor 1001 reads a program (program code), a software module, or data from the storage 1003 and/or the communication IF device 1004 to the memory 1002, and executes various types of processing according to these. As the program, a program that allows a computer to execute at least a portion of the operation described in the embodiment is used. For example, the to-RU signal transmission unit 101, the from-RU signal reception unit 102, the parameter notification unit 103, the RA control unit 104 of the DU 1 and the to-DU signal transmission unit 201, the from-DU signal reception unit 202, the to-UE signal transmission unit 203, the from-UE signal reception unit 204, the parameter acquisition unit 205, and the RA control unit 206 of the RU 2 may be realized by a control program that is stored in the memory 1002 and operates through the processor 1001, and other functional blocks may also be realized in the same manner. Although it has been described that the above-described various types of processing are executed by one processor 1001, it may be executed simultaneously or sequentially by two or more processors 1001. The processor 1001 may be implemented with one or more chips. In addition, the program may be transmitted from the network via an electric communication line.

The memory 1002 is a computer-readable recording medium and is configured with, for example, at least one of a ROM (Read Only Memory), an EPROM (Erasable Programmable ROM), an EEPROM (Electrically Erasable Programmable ROM), and an RAM (Random Access Memory). The memory 1002 may be referred to as a register, a cache, a main memory (main memory), or the like. The memory 1002 can store executable programs (program codes), software modules, and the like for implementing the signal transmission method according to an embodiment of the present invention.

The storage 1003 is a computer-readable recording medium, and may be configured to include, for example, at least one of an optical disk such as a CD-ROM (Compact Disc ROM), a hard disk drive, a flexible disk, a magneto-optical disk (for example, a compact disk, a digital versatile disk, a Blu-ray (registered trademark) disk, or the like), a smart card, a flash memory (for example, a card, a stick, a key drive, or the like), a floppy (registered trademark) disk, a magnetic strip, and the like. The storage 1003 may be referred to as an auxiliary storage device. The above-described storage medium may be, for example, a database including the memory 1002 and/or the storage 1003, a server, or other appropriate medium.

The communication device 1004 is hardware (transmission/reception device) for performing communication between computers via a wired and/or wireless network and is also referred to as a network device, a network controller, a network card, a communication module, or the like. For example, the to-RU signal transmission unit 101 and the from-RU signal reception unit 102 of the DU 1 and the to-DU signal transmission unit 201, the from-DU signal reception unit 202, the to-UE signal transmission unit 203, and the from-UE signal reception unit 204 of the RU 2 may be realized by the communication IF device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. In addition, the input device 1005 and the output device 1006 may be configured to be integrated (for example, a touch panel).

In addition, the respective devices such as the processor 1001 and the memory 1002 are connected via a bus 1007 for communicating information. The bus 1007 may be configured as a single bus or may be configured as different buses between the devices.

In addition, the DU 1 and the RU 2 may be configured to include hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 may be implemented with at least one of the above hardware.

SUMMARY

As described above, according to an embodiment, there is provided a communication device used as a first communication device in a wireless communication system including the first communication device, a second communication device communicating with the first communication device, and a user equipment communicating with the first communication device, the communication device including: an acquisition unit configured to acquire a parameter used for performing a random access procedure from the second communication device; and a control unit configured to notify, to the second communication device, information indicating that a random access preamble indicated by the parameter is received from the user equipment in the case of receiving the random access preamble from the user equipment in a random access channel indicated by the parameter.

According to the communication device eNB, provided is a technique capable of allowing the RA procedure to be performed by allowing the DU and the RU to cooperate with each other.

In addition, the parameter may include information indicating a dedicated preamble allocated to a specific user equipment and a predetermined timer value, and in the case of receiving a dedicated preamble allocated to the specific user equipment before the predetermined timer value expires, the control unit may notify, to the second communication device, information indicating that the dedicated preamble allocated to the specific user equipment has been received from the specific user equipment. Accordingly, in a case where the predetermined timer expires, the RU 2 determines that the dedicated preamble (for example, due to a factor such as moving to another cell) is not transmitted to the user equipment UE and can operate to stop the waiting.

In addition, the parameter may include information on the number of times when a specific type of user equipment is to repetitively transmit the random access preamble, and in the case of receiving the random access preamble corresponding to the number of times when the random access preamble is to repetitively transmitted from the specific type of user equipment, the control unit may notify, to the second communication device, information indicating that the random access preamble has been received from the user equipment. Accordingly, in a case where the user equipment UE is the BL/CE UE, if the RU 2 receives the repetitively transmitted RA preamble a predetermined number of times, the RU 2 can determine that the received RA preamble is appropriate.

In addition, the information indicating that the random access preamble has been received from the user equipment may include an ID of the random access preamble and information indicating a transmission timing to be instructed to the user equipment. Accordingly, the RU 2 can notify the RAPID of the received RA preamble to the DU 1 and report the value of the timing alignment to be instructed to the user equipment UE to the DU 1.

In addition, in the case of receiving the random access preamble indicated by the parameter from the user equipment in the random access channel indicated by the parameter, instead of the information indicating that the random access preamble has been received from the user equipment, the control unit may notify, to the second communication device, the information indicating the radio resource through which Message 3 is transmitted from the user equipment and transmit, to the user equipment, a random access response message including the information indicating the radio resource through which Message 3 is transmitted. Accordingly, when the RA procedure is cooperatively performed by the DU 1 and the RU 2, the RU 2 side can directly transmit the RACH response to the user equipment UE, and thus, it is possible to reduce the processing load on the DU 1 side.

According to an embodiment, there is provided is a random access control method executed by a communication device used as a first communication device in a wireless communication system including the first communication device, a second communication device communicating with the first communication device, and a user equipment communicating with the first communication device, the random access control method including: acquiring a parameter used for performing a random access procedure from the second communication device; and notifying, to the second communication device, information indicating that a random access preamble indicated by the parameter is received from the user equipment in the case of receiving the random access preamble from the user equipment in a random access channel indicated by the parameter. According to the random access control method, provided is a technique capable of allowing the RA procedure to be performed by allowing the DU and the RU to cooperate with each other.

<Supplement to Embodiments>

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

Each aspect/embodiment described in the specification can be applied to LTE (Long Term Evolution), LTE-A (LTE-Advanced), SUPER 3G, INT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), any other systems using an appropriate system and/or next generation systems expanded on the basis of these systems.

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input/output information or the like may be stored in a specific site (for example, a memory) or may be managed in a management table. The input/output Information or the like may be overwritten, updated, or additionally written. The output information or the like may be deleted. The input information or the like may be transmitted to another device.

In addition, information, parameters, and the like described in the specification may be represented by absolute values, may be represented by relative values from predetermined values, or may be represented by another corresponding information. For example, the radio resource may be indicated by an index.

The names used for the above parameters are not limiting in any way. Since the various parameters can be identified by any appropriate names, the names of such various parameters are not limitative in any points.

In some cases, the terms "determining" and "deciding" used in the specification may include a wide variety of operations. The "determining" or the "deciding" may include something regarded as "determining" or "deciding" of, for example, calculating, computing, processing, deriving, investigating, looking up (for example, looking up in a table, a database, or other data structures), or ascertaining. In addition, the "determining" or the "deciding" may include something regarded as "determining" or "deciding" of receiving (for example, receiving information), transmitting (for example, transmitting information), input, output, or accessing (for example, accessing data in memory). In addition, the "determining" or the "deciding" may include something regarded as "determining" or "deciding" of resolving, selecting, choosing, establishing, comparing, or the like. In other words, the "determining" or the "deciding" may include something regarded as "determining" or "deciding" of some operation.

The phrase "on the basis of" used in the specification does not denote "on the basis of only" unless explicitly stated otherwise. In other words, the phrase "on the basis of" denotes both "on the basis of only" and "on the basis of at least".

Any reference to elements using notation such as "first", "second", or the like as used herein do not generally limit the amount or order of the elements. In the specification, the notation may be used as a convenient method to distinguish two or more elements. Therefore, the reference to the first and second elements does not denote that only two elements can be used therein or that the first element needs to precede the second element in some form.

In some cases, the user equipment UE may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term by the skilled in the art.

Although the present invention has been described above in detail, it will be apparent to the skilled in the art that the present invention is not limited to the embodiments described herein. The present invention can be implemented as changes and modifications without departing from the spirit and scope of the present invention as defined by the scope of the claims. Accordingly, the description of the specification is provided for the purpose of illustration and explanation and does not have any restrictive meaning with respect to the present invention.

In addition, in the embodiment, the RU 2 is an example of the first communication device. DU 1 is an example of the second communication device.

The present application is based on and claims priority to Japanese patent application No. 2016-106835 filed on May 27, 2016, the entire contents of which are hereby incorporated by reference.

EXPLANATIONS OF LETTERS OR NUMERALS

1 DU
2 RU
UE user equipment
101 to-UR signal transmission unit
102 from-RU signal reception unit
103 parameter notification unit
104 RA control unit
201 to-DU signal transmission unit
202 from-DU signal reception unit
203 to-UE signal transmission unit
204 from-UE signal reception unit
205 parameter acquisition unit
206 RA control unit
1001 processor
1002 memory
1003 storage
1004 communication IF device
1005 input device
1006 output device

The invention claimed is:

1. A communication device used as a first communication device in a wireless communication system including the first communication device, a second communication device communicating with the first communication device, and a user equipment communicating with the first communication device, the communication device comprising:
   a processor that acquires a parameter used for performing a random access procedure from the second communication device; and
   a transmitter coupled to the processor that transmits, in the case of receiving a random access preamble indicated by the parameter from the user equipment in a random access channel indicated by the parameter, information indicating that the random access preamble has been received from the user equipment to the second communication device,
   wherein the first communication device receiving the random access preamble, from the user equipment, indicated by the parameter includes a layer function that is different from a layer function of the second communication device receiving from the first communication device the information indicating that the random access preamble has been received from the user equipment.

2. The communication device according to claim 1,
wherein the parameter includes information indicating a dedicated preamble allocated to a specific user equipment and a predetermined timer value, and
wherein, in the case of receiving a dedicated preamble allocated to the specific user equipment before the predetermined timer value expires, the transmitter transmits information indicating that the dedicated preamble allocated to the specific user equipment has been received from the specific user equipment to the second communication device.

3. The communication device according to claim 2,
wherein the parameter includes information related to the number of times a specific type of user equipment is to repetitively transmit the random access preamble, and
wherein, in the case of having received the random access preamble for the number of times the random access preamble is to be repetitively transmitted from the specific type of user equipment, the transmitter transmits information indicating that the random access preamble has been received from the user equipment to the second communication device.

4. The communication device according to claim 2, wherein the information indicating that the random access preamble has been received from the user equipment includes an ID of the random access preamble and information indicating a transmission timing to be instructed to the user equipment.

5. The communication device according to claim 2,
wherein, in the case of receiving the random access preamble indicated by the parameter from the user equipment in the random access channel indicated by the parameter, the transmitter transmits to the second communication device, instead of the information indicating that the random access preamble has been received from the user equipment, information indicating the radio resource through which Message 3 is to be transmitted from the user equipment, and transmits to the user equipment a random access response message including the information indicating the radio resource through which Message 3 is to be transmitted.

6. The communication device according to claim 1,
wherein the parameter includes information related to the number of times a specific type of user equipment is to repetitively transmit the random access preamble, and
wherein, in the case of having received the random access preamble for the number of times the random access preamble is to be repetitively transmitted from the specific type of user equipment, the transmitter transmits information indicating that the random access preamble has been received from the user equipment to the second communication device.

7. The communication device according to claim 6, wherein the information indicating that the random access preamble has been received from the user equipment includes an ID of the random access preamble and information indicating a transmission timing to be instructed to the user equipment.

8. The communication device according to claim 6,
wherein, in the case of receiving the random access preamble indicated by the parameter from the user equipment in the random access channel indicated by the parameter, the transmitter transmits to the second communication device, instead of the information indicating that the random access preamble has been received from the user equipment, information indicating the radio resource through which Message 3 is to be transmitted from the user equipment, and transmits to the user equipment a random access response message including the information indicating the radio resource through which Message 3 is to be transmitted.

9. The communication device according to claim 1, wherein the information indicating that the random access preamble has been received from the user equipment includes an ID of the random access preamble and information indicating a transmission timing to be instructed to the user equipment.

10. The communication device according to claim 9,
wherein, in the case of receiving the random access preamble indicated by the parameter from the user equipment in the random access channel indicated by the parameter, the transmitter transmits to the second communication device, instead of the information indicating that the random access preamble has been received from the user equipment, information indicating the radio resource through which Message 3 is to be transmitted from the user equipment, and transmits to the user equipment a random access response message including the information indicating the radio resource through which Message 3 is to be transmitted.

11. The communication device according to claim 1,
wherein, in the case of receiving the random access preamble indicated by the parameter from the user equipment in the random access channel indicated by the parameter, the transmitter transmits to the second communication device, instead of the information indicating that the random access preamble has been received from the user equipment, information indicating the radio resource through which Message 3 is to be transmitted from the user equipment, and transmits to the user equipment a random access response message including the information indicating the radio resource through which Message 3 is to be transmitted.

12. A random access control method executed by a communication device used as a first communication device in a wireless communication system including the first communication device, a second communication device communicating with the first communication device, and a user equipment communicating with the first communication device, the random access control method comprising:
acquiring a parameter used for performing a random access procedure from the second communication device; and
transmitting, in the case of receiving a random access preamble from the user equipment in a random access channel indicated by the parameter, information indicating that the random access preamble indicated by the parameter is received from the user equipment to the second communication device,
wherein the first communication device receiving the random access preamble, from the user equipment, indicated by the parameter includes a layer function that is different from a layer function of the second communication device receiving from the first communication device the information indicating that the random access preamble has been received from the user equipment.

* * * * *